US008745417B2

(12) United States Patent
Huang et al.

(10) Patent No.: US 8,745,417 B2
(45) Date of Patent: Jun. 3, 2014

(54) COMPUTER SYSTEM AND NOTEBOOK COMPUTER, AND METHOD FOR CONTROLLING COMPUTER SYSTEM

(75) Inventors: Maolin Huang, Beijing (CN); Xiaojian Ding, Beijing (CN); Xingwen Chen, Beijing (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 591 days.

(21) Appl. No.: 12/317,482

(22) Filed: Dec. 23, 2008

(65) Prior Publication Data

US 2009/0177898 A1   Jul. 9, 2009

(30) Foreign Application Priority Data

Dec. 27, 2007  (CN) .......................... 2007 1 0304407

(51) Int. Cl.
*G06F 1/26* (2006.01)
*G06F 1/32* (2006.01)

(52) U.S. Cl.
USPC ............................. 713/300; 713/320; 713/324

(58) Field of Classification Search
USPC .......... 713/300, 310, 322, 323, 324, 340, 375
See application file for complete search history.

(56) References Cited

U.S. PATENT DOCUMENTS

| | | | | |
|---|---|---|---|---|
| 6,240,521 B1* | 5/2001 | Barber et al. | ................. | 713/323 |
| 6,501,999 B1* | 12/2002 | Cai | ................. | 700/82 |
| 6,631,474 B1* | 10/2003 | Cai et al. | ................. | 713/300 |
| 6,836,850 B2* | 12/2004 | Cheng | ................. | 713/324 |
| 7,152,171 B2* | 12/2006 | Chandley et al. | ............. | 713/320 |
| 7,231,531 B2* | 6/2007 | Cupps et al. | ................. | 713/322 |
| 7,428,650 B2* | 9/2008 | Kardach et al. | ................ | 713/323 |
| 7,472,301 B2* | 12/2008 | Ginggen et al. | .............. | 713/324 |
| 7,725,748 B1* | 5/2010 | Kedia et al. | .................... | 713/323 |
| 7,982,742 B2* | 7/2011 | Casparian et al. | ............ | 345/502 |
| 2002/0066048 A1* | 5/2002 | Cheng | ........................... | 713/330 |
| 2005/0066006 A1 | 3/2005 | Fleck et al. | | |
| 2005/0154930 A1* | 7/2005 | Morrow | ........................ | 713/300 |
| 2007/0234130 A1* | 10/2007 | Sullivan et al. | ................. | 714/43 |
| 2008/0162914 A1* | 7/2008 | Adrangi et al. | .................. | 713/2 |
| 2009/0193243 A1* | 7/2009 | Ely | .................................. | 713/2 |

FOREIGN PATENT DOCUMENTS

CN   1355471 A   6/2002
CN   1567139 A   1/2005

* cited by examiner

*Primary Examiner* — Khanh Dang
(74) *Attorney, Agent, or Firm* — Schwegman Lundberg & Woessner, P.A.

(57) ABSTRACT

The present invention provides a computer system, a notebook computer and a method for controlling a computer system. The method comprises steps of: determining current state of the main computer subsystem; turning off the power of the embedded subsystem or enabling the embedded subsystem into a low-power state of the embedded subsystem when the main computer subsystem stays in a power-on state of the main computer subsystem; and enabling the embedded subsystem into an operating state of the embedded subsystem when the main computer subsystem stays in a low-power state or a shut-down state of the main computer subsystem. The computer system comprises: a power supply, a main computer subsystem and an embedded subsystem, wherein the main computer subsystem comprises a state determination module and a state control module for the embedded subsystem. The notebook computer comprises a main board, an embedded subsystem and a power supply, wherein the main board comprises an embedded controller and a power switch controller as well. With the above technical solutions, the power consumption caused by the embedded subsystem is reduced while implementing a preset function in real time.

22 Claims, 5 Drawing Sheets

COMPUTER SYSTEM AND NOTEBOOK COMPUTER, AND METHOD FOR CONTROLLING COMPUTER SYSTEM

RELATED APPLICATIONS

This application claims the benefit of priority, under 35U.S.C. Section 119, to Chinese Patent Application Serial No. 200710304407.3, filed on Dec. 27, 2007, which is incorporated herein by reference in its entirety.

BACKGROUND OF THE INVENTION

1. Field of Invention

The present invention relates to computers, in particular to a computer system, a notebook computer and a method for controlling the computer system.

2. Description of Prior Art

Presently, in order to make a computer system implement certain functions, such as sending and receiving emails when the computer system is not in work, such as in its stand-by state or shut-down state, an embedded subsystem for implementing preset functions, such as an embedded subsystem for implementing the function of sending and receiving emails in real time, may be arranged or inserted into the computer system on the basis of the existing computer system infrastructure, for example on the main board of the existing computer. In general, in order to ensure sending and receiving emails in real time, the embedded subsystem will always stay in an operating state after being connected with the main computer subsystem, regardless of the main computer subsystem's current state. In this manner, although the real-time email sending and receiving may be ensured, the power of the overall system are greatly consumed, resulting in a short stand-by time for the system.

SUMMARY OF THE INVENTION

An embodiment of the present invention is provided with a computer system, a notebook computer and a method for controlling such a computer system, which can reduce the power consumption caused by an embedded subsystem while implementing preset functions in real time.

For this purpose, in an aspect, the present invention provides a method for controlling a computer system, the computer system comprising a main computer subsystem and an embedded subsystem configured to realize a preset function, the main computer subsystem including a functional module for implementing the preset function. The functional module is in an operating state while the main computer subsystem stays in a power-on state of the main computer subsystem. The control method comprises the following steps:
determining current state of the main computer subsystem;
turning off power of the embedded subsystem or enabling the embedded subsystem into a low-power state of the embedded subsystem when the main computer subsystem stays in the power-on state of the main computer subsystem;
enabling the embedded subsystem into an operating state of the embedded subsystem when the main computer subsystem stays in a low-power state or a shut-down state of the main computer subsystem.

In another aspect, the present invention provides a computer system, which comprises a main computer subsystem, an embedded subsystem configured to realize a preset function and a power supply connected to the main computer subsystem and to the embedded subsystem, the main computer subsystem including a functional module for implementing the preset function, wherein the functional module is in an operating state while the main computer subsystem stays in a power-on state of the main computer subsystem. The main computer subsystem further comprises:
a state determination module for determining current state of the main computer subsystem;
a state control module for the embedded system, which is connected to the power supply of the embedded system and is adapted to turn off the power of the embedded subsystem or to enable the embedded subsystem into a low-power state of the embedded subsystem when the main computer subsystem stays in the power-on state of the main computer subsystem, and adapted to enable the embedded subsystem into an operating state of the embedded subsystem when the main computer subsystem stays in a low-power state or a shut-down state of the main computer subsystem.

In a further aspect, the present invention provides a notebook computer. The notebook computer comprises a main board, an embedded subsystem and a power supply for supplying power to the main board and the embedded subsystem. The main board comprises an embedded controller. The notebook computer further comprises a power switch controller connected to the embedded controller and to the embedded subsystem.

The embedded controller is adapted to turn off the power of the embedded subsystem by controlling the power switch controller when the notebook computer stays in a power-on state of the notebook computer, and to turn on power of the embedded subsystem by controlling the power switch controller when the notebook computer stays in a low-power state or a shut-down state of the notebook computer.

The above technical solutions have the following technical effects.

The computer system is allowed to turn off the power of the embedded subsystem or to enable the embedded subsystem into a low-power state of the embedded subsystem, such as a stand-by state or a dormant state, and to use its own functional module instead to implement present functions when the main computer subsystem stays in a power-on state of the main computer subsystem by controlling the state of the embedded subsystem for implementing the preset functions, such as sending and receiving email in real time or monitoring virus in real time. The power of the embedded subsystem can be turned on to enable the embedded subsystem into an operating state only when the main computer subsystem stays in a low-power state of the main computer subsystem, such as the stand-by state or the dormant state, or stays in a shut-down state of the main computer subsystem, in which the main computer subsystem is not in work. Therefore, the above technical solutions of the present invention achieve the real-time implementation of the preset functions, without requiring the embedded subsystem for always staying in an operating state, thereby reduce the power consumption of the computer system and prolong stand-by time for the system.

DETAILED DESCRIPTION OF PREFERRED EMBODIMENTS

To make the technical problems that embodiments of the present invention intend to solve, the technical solutions and advantages more apparent, the present invention will be described in detail below, in combination with the drawings and embodiments.

Figure 1:
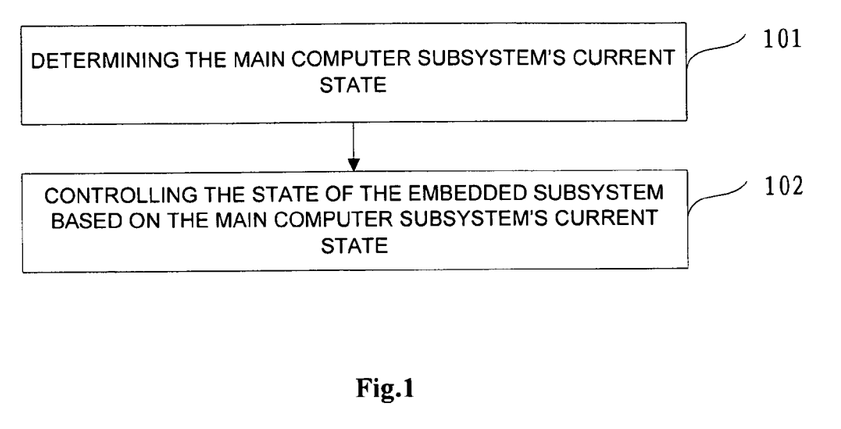
FIG. 1 is a flowchart of a method for controlling a computer system according to an embodiment of the present invention.

FIG. 1 is a flowchart of a method for controlling a computer system according to an embodiment of the present invention. In this embodiment, the computer system comprises a main computer subsystem and an embedded subsystem configured to realize a preset function. The embedded subsystem may be an Always on System, i.e. a system that implements the present function even when the main computer subsystem is not in work, for example a system for sending and receiving emails in real time. The main computer subsystem is a computer that is not connected with the embedded system in the existing art. A functional module for implementing the preset function is arranged on the main computer subsystem, such as functional software installed on the main computer subsystem, which works while the main computer subsystem stays in a power-on state. For example, the functional module may be software for sending and receiving emails, which sends and receives emails when the main computer subsystem stays in its power-on state. As an example, in the embodiments according to the invention, the above preset function may be a function for sending and receiving emails, a function for monitoring virus, and any other functions which may be required to operate when the main computer subsystem is not in work. The preset function that the embedded subsystem is intended to implement has no effect on the implementation of the technical solution of the present invention.

As shown in FIG. 1, a method for controlling power of a computer system according to one embodiment of the present invention comprises the following steps:

step 101 of determining current state of the main computer subsystem;

step 102 of controlling the state of the embedded subsystem based on the current state of the main computer subsystem, comprising turning off the power of the embedded subsystem or enabling the embedded subsystem into a low-power state when the main computer subsystem stays in a power-on state; and enabling the embedded subsystem into an operating state when the main computer subsystem stays in a low-power state or a shut-down state.

In this embodiment, by way of example, the current state of the main computer subsystem is determined when the embedded subsystem is connected to the main computer subsystem.

Although the embedded subsystem may be connected to the main computer subsystem illustratively via an Expresscard Slot arranged on the main computer subsystem, the embedded subsystem may also be connected to the main computer subsystem in other manners, for example the embedded subsystem may be integrated into the computer, such as into the main board of the computer. Alternatively, when the main computer subsystem is a notebook computer, an application processor of the embedded subsystem and the embedded controller of the notebook computer may be one and the same processor.

Figure 2:
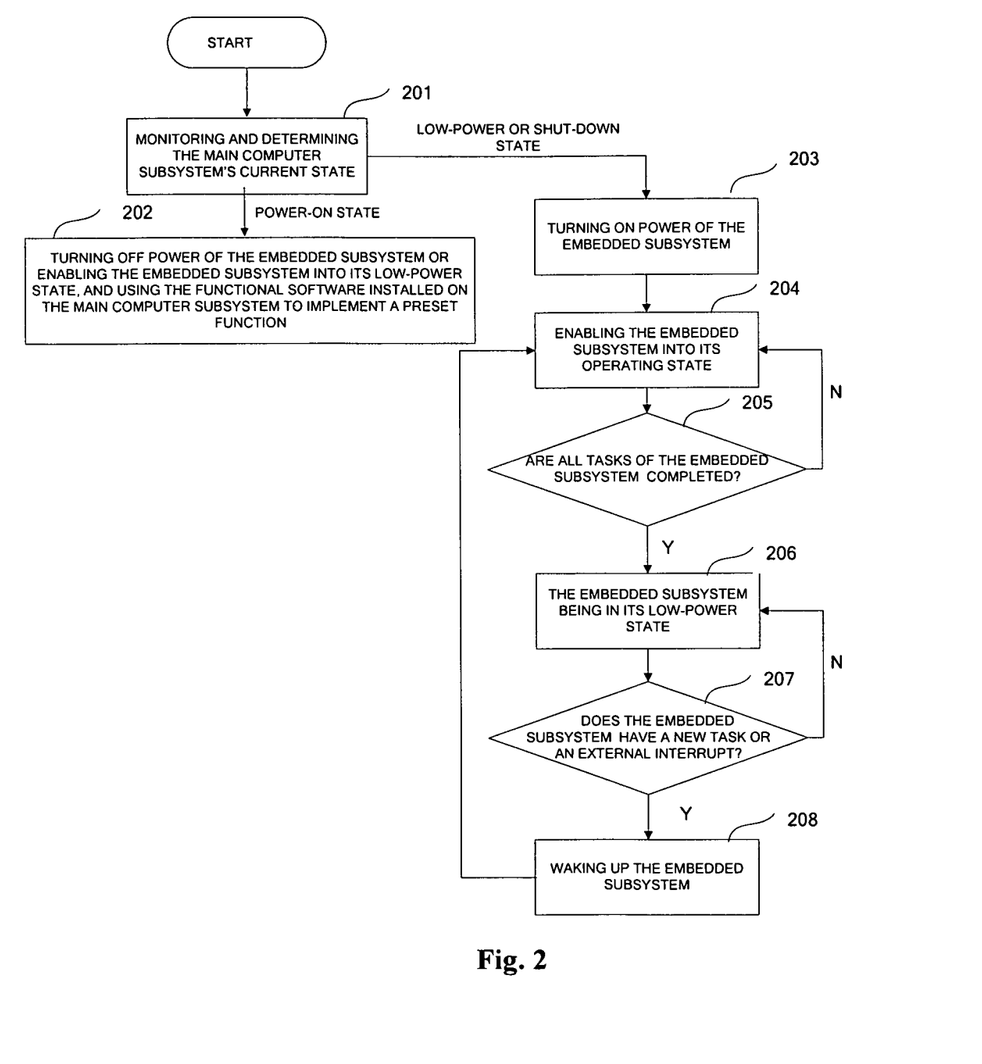
FIG. 2 is a flowchart of a method for controlling a computer system according to another embodiment of the present invention.

FIG. 2 is a flowchart of a method for controlling power of a computer system according to another embodiment of the present invention. As shown in FIG. 2, the method for controlling power of the computer system according to another embodiment of the present invention comprises the following steps:

step 201 of monitoring and determining current state of the main computer subsystem. If the main computer subsystem is in the power-on state of the main computer subsystem, the method proceeds to step 202; if it is in the low-power state of the main computer subsystem, such as the stand-by state or the shut-down state, the method proceeds to step 203;

step 202 of turning off the power of the embedded subsystem or enabling the embedded subsystem into a low-power state of the embedded subsystem, such as a stand-by state, a dormant state and the like. At step 202, the main computer subsystem stays in its operation state, implements a preset function by the functional software installed on the main computer subsystem, and continues monitoring the current state of the main computer subsystem after completing the function;

step 203 of turning on the power of the embedded subsystem;

step 204 of enabling the embedded subsystem into an operating state of the embedded subsystem, so as to implement the preset function;

step 205 of determining whether all tasks for the embedded subsystem have been completed or not; if yes, the method proceeds to step 206, if not, the method proceeds to step 204, where the embedded subsystem will continue to implement the preset function;

step 206 of controlling the embedded subsystem to stay in the low-power state of the embedded subsystem, such as the dormant state;

step 207 of determining whether the embedded subsystem has a new task or an external interrupt; if yes, the method proceeds to step 208; otherwise, the embedded subsystem still stays in the dormant state; and step 208 of waking up the embedded subsystem, causing it to return to an operating state of the embedded subsystem and implement the new task or respond to the external interrupt.

In this embodiment of the present invention, the main computer subsystem's current state is monitored. Once there is a change of the state, a corresponding process is performed.

In this embodiment of the present invention, illustratively, in order to avoid data loss, a communication between the main computer subsystem and the embedded subsystem may be performed before changing the power switch state of the embedded subsystem, and it may be determined whether the embedded subsystem's current state can be changed, so as to avoid a change of the state of the embedded subsystem at an inappropriate time.

In this embodiment of the present invention, illustratively, in order to avoid the data loss, data synchronization between the embedded subsystem and the main computer subsystem may be performed before turning off the power of the embedded subsystem or enabling the embedded subsystem into the low-power state. The power of the embedded subsystem can be turned off only after the data synchronization of the embedded subsystem to the main computer subsystem. In the same way, data synchronization between the embedded subsystem and the main computer subsystem is required before the computer system can enter its low-power state, such as the stand-by state or the dormant state, and its shut-down state. Only after the main computer subsystem is in data synchronization with the embedded subsystem, the main computer subsystem may be suspended.

Figure 3:
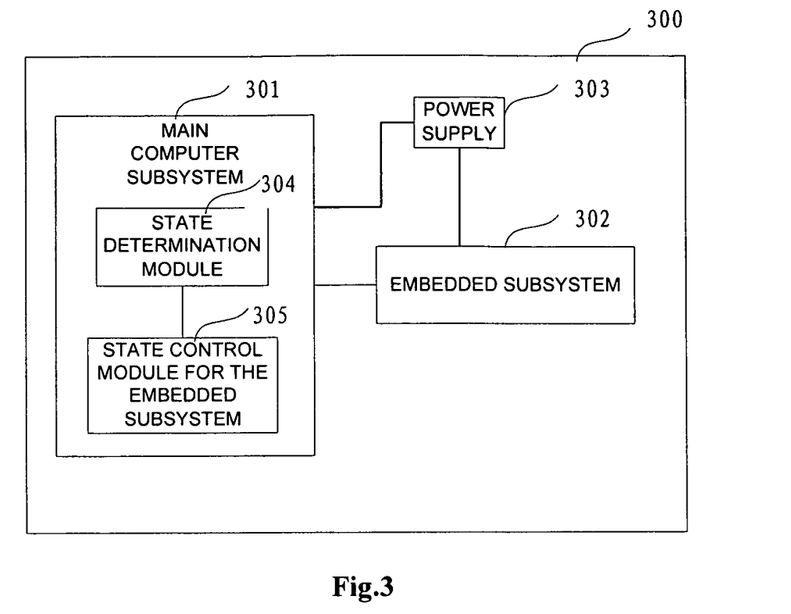
FIG. 3 is a structural schematic diagram of a computer system according to an embodiment of the present invention.

The preset invention further discloses a computer system. As shown in FIG. 3, the computer system 300 according to an embodiment of the present invention comprises a main computer subsystem 301, an embedded subsystem 302 configured to realize a preset function and a power supply 303 connected to the main computer subsystem and to the embedded subsystem, the main computer subsystem 301 including a functional module for implementing the preset function. The functional module is in operating state while the main computer subsystem stays in a power-on state of the main computer subsystem. The main computer subsystem further comprises:

a state determination module 304 for determining current state of the main computer subsystem;

a state control module for the embedded subsystem 305, which is connected to the power supply and is adapted to control the state of the embedded subsystem based on the main computer subsystem's current state, i.e., to turn off the power of the embedded subsystem or to enable the embedded subsystem into a low-power state of the embedded subsystem when the main computer subsystem stays in a power-on state of the main computer subsystem, and to enable the embedded subsystem into an operating state of the embedded subsystem when the main computer subsystem stays in a low-power state or a shut-down state of the main computer subsystem.

Figure 4:
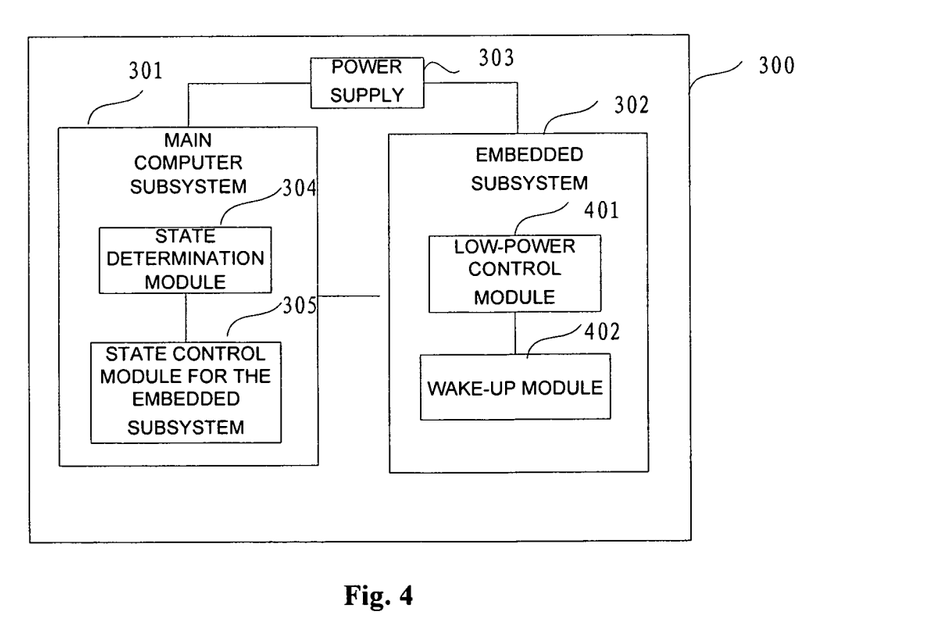
FIG. 4 is a structural schematic diagram of a computer system according to another embodiment of the present invention.

As shown in FIG. 4, the embedded subsystem in the computer system according to the embodiment of the present invention further comprises:

a low-power control module 401 for controlling the embedded subsystem to enter into the low-power state of the embedded subsystem after a task of the embedded subsystem being in an operating state of the embedded subsystem is completed, and/or a wake-up module 402 for waking up the embedded subsystem being in the low-power state of the embedded subsystem, causing it to return to the operating state of the embedded subsystem when the embedded subsystem has a new task or an external interrupt.

In FIG. 4, an example comprising the low-power control module and the wake-up module is shown.

The main computer subsystem in the computer system according to the embodiment of the present invention further comprises:

a data synchronization module for synchronizing the data of the main computer subsystem with the data of the embedded subsystem, before turning off the power of the embedded subsystem and the main computer subsystem entering the low-power state or the shut-down state of the main computer subsystem.

Figure 5:
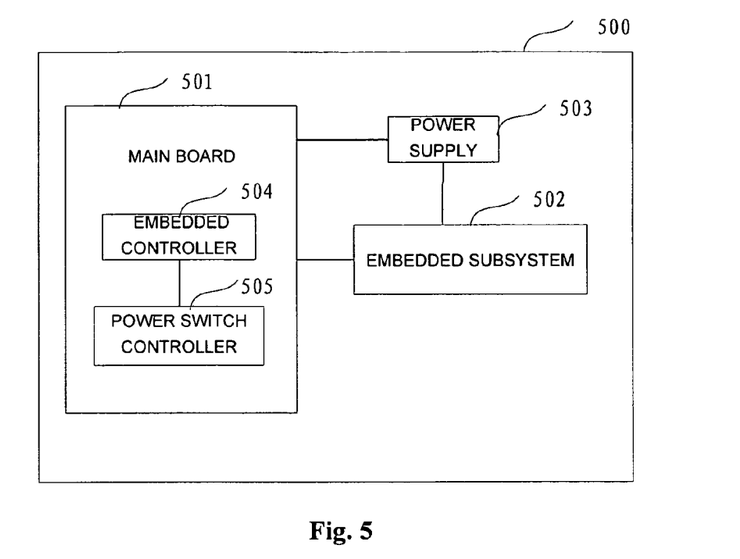
FIG. 5 is a structural schematic diagram of a notebook computer according to an embodiment of the present invention.

The present invention further comprises a notebook computer. As shown in FIG. 5, a notebook computer 500 according to an embodiment of the present invention comprises a main board 501, an embedded subsystem 502, and a power supply 503 for supplying power to the main board and the embedded subsystem. The main board 501 comprises an embedded controller 504. The notebook computer further comprises a power switch controller 505 connected to the embedded controller and to the embedded subsystem. The embedded controller is configured to turn off the power of the embedded subsystem by controlling the power switch controller when the notebook computer stays in a power-on state of the notebook computer, and is adapted to turn on the power of the embedded subsystem by controlling the power switch controller when the notebook computer stays in a power-on state of the notebook computer.

In an implementation, the power switch controller may be or may be not arranged on the main board. FIG. 5 shows an example in which the power switch controller is arranged on the main board.

Preferably, the embedded controller in the notebook computer according to the embodiment of the present invention comprises:

a communication module for communicating with the embedded subsystem and for determining whether the power switch state of the embedded subsystem can be changed.

Preferably, the embedded subsystem in the notebook computer according to the embodiment of the present invention comprises:

a low-power control module for controlling the embedded subsystem to enter into a low-power state after a task of the embedded subsystem being in the operating state of the embedded subsystem is completed.

Preferably, the embedded subsystem in the notebook computer according to the embodiment of the present invention comprises:

a wake-up module for waking up the embedded subsystem being in the low-power state of the embedded subsystem and causing it to return to the operating state of the embedded subsystem when the embedded subsystem has a new task or an external interrupt.

Preferably, the main computer subsystem in the notebook computer according to the embodiment of the present invention comprises:

a data synchronization module for synchronizing the data of the notebook computer with the data of the embedded subsystem, before turning off the power of the embedded subsystem and the notebook computer's suspension.

Figure 6:
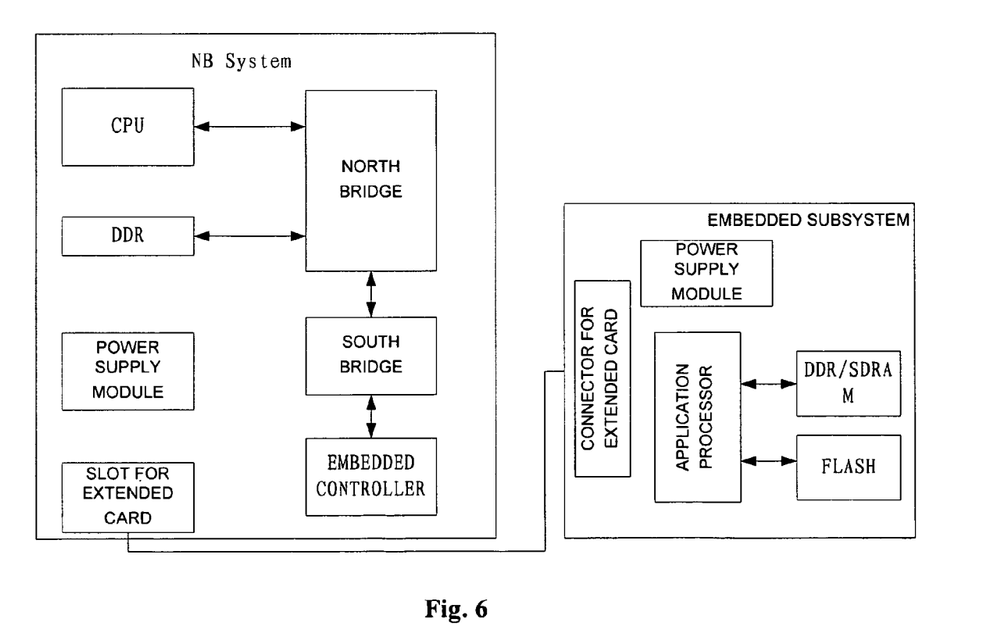
FIG. 6 is an implementation of the notebook computer according to the embodiment of the present invention.
Figure 7:
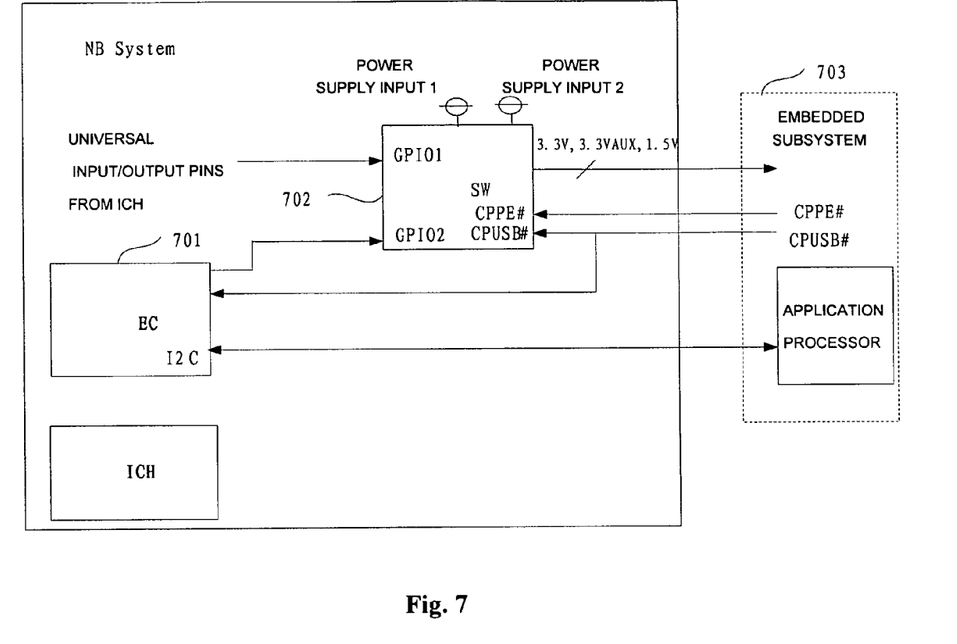
FIG. 7 is a structural schematic diagram of a power control logic and an interface circuit in the implementation of the notebook computer according to the embodiment of the present invention.

In FIG. 6 and FIG. 7, an implementation of the notebook computer according to the embodiment of the present invention is shown. FIG. 6 is a structural diagram of the notebook computer according to the implementation, and FIG. 7 is a diagram for a power control logic and an interface circuit in the notebook computer according to the implementation.

As shown in FIG. 6, the main computer subsystem in the notebook computer according to the implementation is a Notebook System (NB System). The NB system is a new system, which is extension of a Always On System and other auxiliary designs on the basis of the infrastructure of the existing notebook computer, mainly including a central processing unit (CPU), a memory such as a DDR, a power supply module, a south bridge and a north bridge, an Embedded Controller (EC), and a slot interfacing an Express card.

The Always On System is a subsystem, which still implements a preset function after the notebook computer entering a stand-by state and a shut-down state of the notebook computer. Taking email sending and receiving as an example of the preset function, the Always On System is a subsystem that continues sending and receiving email after the notebook enters the stand-by state or the shut-down state of the notebook computer. The Always On System mainly includes an application processor (AP), a memory unit such as DDR/SDRAM and FLASH Memory, a power supply module and a control logic and the like, wherein the application processor is mainly configured to implement the preset functions and communication with the main computer subsystem, and so on.

When the main computer subsystem operates normally, a user will deal with his emails by the notebook computer, since an email processing functional module is arranged in the notebook computer. The Always On System needs not to operate, and the notebook cuts off the power of the subsystem or enables the subsystem into a low-power state of the subsystem. When the notebook computer enters a dormant state or a shut-down state of the notebook computer, the notebook computer turns on the power of the subsystem, and enables the subsystem into an operating state of the subsystem. The notebook computer will suspend after the data synchronization, while the Always On System will continue to deal with the emails. When the notebook computer is started again, it will cut off the power of the subsystem or enable the subsystem into a low-power state of the subsystem again, after the data synchronization.

As shown in FIG. 7, an embedded controller EC 701 controls the state, including the switch state of the power, of an embedded subsystem 703 (i.e. Always On System) arranged in an extended card by controlling a power switch controller SW 702, the embedded controller EC 701 is arranged on the main board. The SW is connected to CPUSB# and CPPE# of the extended car (ExpressCard). The notebook computer determines whether there is an extended card inserted into the notebook main computer subsystem for connecting to the main board, and the type of the inserted card and information thereof. Then the notebook main computer subsystem controls the state of the embedded subsystem based on the subsystem's current state. For example, it controls the power switch controller to turn off the power of the embedded subsystem or to enable the embedded subsystem into a low-power state when the notebook computer subsystem stays in a power-on state, or controls the power switch controller to turn on the power of the embedded subsystem when the notebook computer subsystem stays in its low-power state or shut-down state. In a specific implementation, the EC may firstly communicate with the application processor in the embedded subsystem via an I$^2$C bus, so as to determine whether the switch state of the power can be changed. For example, the switch state of the power can be changed when the data synchronization has been completed, which should be taken as illustrative rather than limiting. If the switch state of the power can be changed, a control signal for changing the switch state of the power is input via a control terminal of the power switch controller, such as universal input/output pins GPIO1 and GPIO2, and thus the switch state of the power of the embedded subsystem is changed, so as to achieve the power control for the embedded subsystem. Thereby the technical solutions of the present invention are achieved with lowered power consumption. A signal on GPIO1 is from a universal input/output pin of the south bridge chip ICH. In addition, it is possible to provide an extended card with different power supplies via power supply input 1 and power supply input 2, so as to satisfy requirements of different cards. Among others, CPUSB# and CPPE# are definitions provided in the ExpressCard specification, for which unnecessary details are omitted.

The above solutions of the embodiments of the present invention turn off the power of the embedded subsystem or enable the embedded subsystem into its low-power state when the computer system stays in power-on sate (S0), and turn on the power of the embedded subsystem and enable it into operating state when the computer system stays in a stand-by state (i.e. a low-power state) or a shut-down state (S3/S4/S5). The embedded subsystem automatically enters into a low-power state such as a dormant state when there is no task. In such a way, the preset functions such as sending and receiving email in real time, scanning virus in real time and the like can be implemented in real time, while reducing the power consumption caused by the embedded subsystem and prolonging the stand-by time of the computer system.

While the above embodiments may have been characterized as being preferred, it should be readily understood that there are various modifications or replacements to the embodiments without departing from the scope and the spirit of the present invention, and they shall fall into the scope defined by the appended claims.

What is claimed is:

1. A method for controlling a computer system, said computer system comprising a main computer subsystem and an embedded subsystem configured to perform a preset function, wherein the main computer subsystem comprises a central processing unit, a memory, a power supply module, a south bridge and a north bridge and an Embedded Controller (EC), and the embedded subsystem comprises an application processor, a memory unit, a power supply module and control logic, wherein the main computer subsystem including a functional module for implementing the preset function, and wherein the application processor of the embedded subsystem implements the preset function even when the main computer subsystem is not in an operating state, and wherein the functional module is in an operating state while the main computer subsystem stays in a power-on state of the main computer subsystem, said method comprising steps of:

turning on the main computer subsystem to a power-on state, or turning off the main computer subsystem to a shut-down state, independent on the state of the embedded subsystem;

determining current state of the main computer subsystem;

automatically turning off the power of the embedded subsystem or enabling the embedded subsystem into a low-power state of the embedded subsystem if it is determined that the main computer subsystem stays in the power-on state of the main computer subsystem and the preset function is implemented by the functional module of the main computer subsystem; and automatically enabling the embedded subsystem into an operating state of the embedded subsystem if it is determined that the main computer subsystem stays in a low-power state of the main computer subsystem or a shut-down state of the main computer subsystem, wherein the preset function is implemented by the application processor of the embedded subsystem, wherein the preset function is always enabled in the computer system by either the main computer subsystem or the embedded subsystem, whether the computer system is on or off, wherein the EC of the main computer subsystem determines whether to switch state of the power of the embedded subsystem by communicating with the application processor in the embedded subsystem via a bus, and wherein the EC changes the state of the power of the embedded subsystem by means of a control signal which is input via a control terminal of a power switch controllers connected to the EC.

2. The method according to claim 1, further comprising:

controlling the embedded subsystem to enter into the low-power state of the embedded subsystem after a task of the embedded subsystem being in the operating state of the embedded subsystem is completed.

3. The method according to claim 2, further comprising:

waking up the embedded subsystem being in the low-power state of the embedded subsystem when the embedded subsystem has a new task or an external interrupt.

4. The method according to claim 1, before the step of turning off the power of the embedded subsystem, further comprising: synchronizing data of the main computer subsystem with data of the embedded subsystem.

5. The method according to claim 1, before the step of turning off the power of the embedded subsystem or enabling the embedded subsystem into a low-power state of the embedded subsystem, further comprising: communicating with the embedded subsystem and determining whether the state of the embedded subsystem is changeable.

6. The method according to claims 1, wherein the preset function includes receiving and sending email in real time, and monitoring virus.

7. The method according to claim 1, wherein the embedded subsystem connects to the main computer subsystem via an Expresscard slot on the main computer subsystem.

8. The method according to claim 7, wherein the EC of the main computer subsystem determines whether there is an Expresscard inserted into the main computer subsystem, and the type of the inserted Expresscard and information thereof from input signals on CPUSB# and CPPE# of the Expresscard slot.

9. The method according to claim 1, wherein the bus is an I²C bus.

10. A computer system, comprising a main computer subsystem, an embedded subsystem configured to implement a preset function and a power supply connected to the main computer subsystem and to the embedded subsystem, the main computer subsystem comprises a central processing unit, a memory, a power supply module, a south bridge and a north bridge and an Embedded Controller (EC), and the embedded subsystem comprises an application processor, a memory unit, a power supply module and a control logic, wherein the main computer subsystem including a functional module for implementing the preset function wherein the application processor of the embedded subsystem implements the preset function even when the main computer subsystem is not in an operating state, and wherein, the functional module is in an operating state while the main computer subsystem stays in a power-on state of the main computer subsystem; and the main computer subsystem further comprises:
  a state determination module for determining current state of the main computer subsystem;
  a state control module for the embedded subsystem, which is connected to the power supply and is adapted to automatically turn off the power of the embedded subsystem or to automatically enable the embedded subsystem into a low-power state of the embedded subsystem if the state determination module determines that the main computer subsystem stays in the power-on state of the main computer subsystem and the preset function is implemented by the functional module of the main computer subsystem, and is adapted to enable the embedded subsystem into an operating state of the embedded subsystem if the state determination module determines that the main computer subsystem stays in a low-power state or a shut-down state of the main computer subsystem wherein the preset function is implemented by the application processor of the embedded subsystem,
wherein the main computer subsystem is turned on to a power-on state, or turned off to a shut-down state, independent on the state of the embedded subsystem, and wherein the preset function is always enabled in the computer system by either the main computer subsystem or the embedded subsystem, whether the computer system is on or off, wherein the EC of the main computer subsystem determines whether to switch state of the power of the embedded subsystem by communicating with the application processor in the embedded subsystem via a bus, and wherein the EC changes the state of the power of the embedded subsystem by means of a control signal which is input via a control terminal of a power switch controllers connected to the EC.

11. The computer system according to claim 10, wherein the embedded subsystem further comprises:
  a low-power control module for controlling the embedded subsystem to enter into the low-power state of the embedded subsystem after a task of the embedded subsystem being in the operating state of the embedded subsystem is completed; and
  a wake-up module for waking up the embedded subsystem being in the low-power state of the embedded subsystem when the embedded subsystem has a new task or an external interrupt.

12. The computer system according to claim 10, wherein the main computer subsystem further comprises:
  a data synchronization module for synchronizing data of the main computer subsystem with data of the embedded subsystem before the power of the embedded subsystem is turned off.

13. The computer system according to claim 10, wherein the embedded subsystem connects to the main computer subsystem via an Expresscard slot on the main computer subsystem.

14. The computer system according to claim 13, wherein the EC of the main computer subsystem determines whether there is an Expresscard inserted into the main computer subsystem, and the type of the inserted Expresscard and information thereof from input signals on CPUSB# and CPPE# of the Expresscard slot.

15. The computer system according to claim 10, wherein the bus is an I²C bus.

16. A notebook computer, comprising a main board, an embedded subsystem, and a power supply for supplying power to the main board and the embedded subsystem, the main board comprises a central processing unit, a memory, a power supply module, a south bridge and a north bridge and an Embedded Controller (EC), and the embedded subsystem comprises an application processor, a memory unit, a power supply module and a control logic, wherein the application processor of the embedded subsystem implements a preset function even when the notebook computer is not in operation, and the main board includes a functional module for implementing the preset function, said notebook computer further comprising:
  a power switch controller connected to the embedded controller and to the embedded subsystem,
wherein the embedded controller is adapted to automatically turn off power of the embedded subsystem by controlling the power switch controller when the notebook computer stays in a power-on state of the notebook computer and the preset function is implemented by the functional module of the notebook computer, and is adapted to automatically turn on the power of the embedded subsystem by controlling the power switch controller when the notebook computer stays in a low-power state or a shut-down state of the notebook computer, wherein the preset function is implemented by the application processor of the embedded subsystem, and wherein the notebook computer is turned on to a power-on state, or turned off to a shut-down state, independent on the state of the embedded subsystem, and wherein the preset function is always enabled in the notebook computer by either the functional module or the embedded subsystem, whether the notebook computer is on or off, wherein the EC of the main board determines whether to switch state of the power of the embedded subsystem by communicating with the application processor in the embedded subsystem via a bus, and wherein the EC changes the state of the power of the embedded subsystem by means of a control signal which is input via a control terminal of the power switch controller.

17. The notebook computer according to claim 16, wherein, said embedded controller comprises:
- a communication module for communicating with the embedded subsystem and determining whether the state of the power supply of the embedded subsystem is changeable.

18. The notebook computer according to claim 16, wherein, said embedded subsystem comprises:
- a low-power control module for controlling the embedded subsystem to enter into a low-power state of the embedded subsystem after a task of the embedded subsystem being in an operating state of the embedded subsystem is completed.

19. The notebook computer according to claim 16, wherein, said embedded subsystem comprises:
- a wake-up module for waking up the embedded subsystem being in the low-power state of the embedded subsystem when the embedded subsystem has a new task or an external interrupt.

20. The notebook computer according to claim 16, wherein the embedded subsystem connects to the main board via an Expresscard slot on the main board.

21. The notebook computer according to claim 20, wherein the EC of the main board determines whether there is an Expresscard inserted into the main computer subsystem, and the type of the inserted Expresscard and information thereof from input signals on CPUSB# and CPPE# of the Expresscard slot.

22. The notebook computer according to claim 16, the bus is an $I^2C$ bus.

* * * * *